United States Patent
Ackaret et al.

(10) Patent No.: US 7,124,329 B2
(45) Date of Patent: Oct. 17, 2006

(54) IMPLEMENTING MEMORY FAILURE ANALYSIS IN A DATA PROCESSING SYSTEM

(75) Inventors: Jerry Don Ackaret, Beaverton, OR (US); Barry Eugene Jaked, Holly Springs, NC (US); Wilson Earl Smith, Bahama, NC (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 10/672,887

(22) Filed: Sep. 26, 2003

(65) Prior Publication Data

US 2005/0081114 A1    Apr. 14, 2005

(51) Int. Cl.
*G06F 11/00* (2006.01)
(52) U.S. Cl. .......................................... 714/42; 714/55
(58) Field of Classification Search ................. 714/42, 714/55, 708, 709
See application file for complete search history.

(56) References Cited

U.S. PATENT DOCUMENTS 6,363,496 B1 * 3/2002 Kwiat ........................... 714/4
6,505,305 B1 * 1/2003 Olarig ........................... 714/5
2004/0143719 A1 * 7/2004 Nguyen et al. .............. 711/202

\* cited by examiner

*Primary Examiner*—Robert Beausoliel
*Assistant Examiner*—Matthew Urick
(74) *Attorney, Agent, or Firm*—Joseph P. Lally; Cynthia Byrd

(57) ABSTRACT

A system includes a data processing core coupled to a system memory employing error correction code (ECC) circuitry. The core includes an indicator of when a correctable system memory error occurs and what address is associated with the error. A watchdog timer is instantiated on a system management device. Periodically, the timer prompts the management device to interrupt the processor and poll the error indicator to determine if a memory error has been detected. If an error is detected, the corresponding physical memory address is recorded. If a predetermined number of consecutive errors associated with a single memory address or range of addresses occurs, an alert is issued. In one embodiment, polling the error indicator is infrequent initially. As additional errors are detected, the polling frequency increases. At higher polling frequencies, the system may require a greater number of consecutive errors before taking additional action.

18 Claims, 2 Drawing Sheets

IMPLEMENTING MEMORY FAILURE ANALYSIS IN A DATA PROCESSING SYSTEM

BACKGROUND

1. Field of the Present Invention

The present invention is in the field of data processing systems and, more particularly, data processing systems employing error correction in their memory subsystems.

2. History of Related Art

Error code correction (ECC) circuitry is used to detect and correct single bit errors that occur within a data processing system. ECC is most widely implemented in conjunction with main memory subsystems. In systems that employ ECC circuitry, the processor(s) may include dedicated hardware for counting the number of correctable errors detected and for initiating an interrupt procedure in response to an error correction status register. In other processors, however, ECC may be implemented without these dedicated resources. The Opteron® processor from Advanced Micro Devices, for example, integrates a memory controller that uses ECC into the processor but does not incorporate an ECC count register or an ECC status register capable of initiating an interrupt. For purposes of predictive failure analysis to anticipate and prevent significant system failures involving data loss and so forth, it is highly desirable to monitor the number of correctable errors and to take action when the number or pattern of such errors is symptomatic of a more serious condition such as a hard failure or a persistent source of error. It would therefore be desirable to provide a mechanism and method that would enable a processor/system that uses ECC to issue an alert or take other appropriate action based upon the number and source of correctable errors. It would be further desirable if the implemented solution provided a method for reliably determining when a particular location in memory is exhibiting error behavior warranting additional consideration, without compromising system performance by flooding the processor within error correction status queries.

SUMMARY OF THE INVENTION

The objective identified above is achieved by a system and method according to the present invention in which a data processing core coupled to a system memory includes error correction code (ECC) circuitry. The data processing core also includes an indicator of when a correctable error occurs during a system memory access. The indicator typically further indicates a system memory address associated with the error. A watchdog timer is started on a management device of the system. A set of timing parameters is initialized to predetermined values. Periodically, the timer prompts the management device to interrupt the processor and poll the error indicator to determine if a memory error has been detected. If an error is detected, the corresponding physical memory address is recorded. If the next regular polling of the indicator reveals a second error from the same system memory address range associated with the same physical device, the frequency of polling is increased. At this increased level of polling frequency, the number of consecutive errors is also increased (e.g., doubled) such that, if four consecutive errors from the same memory address range are detected, the frequency is increased again. This pattern is repeated until a predetermined number of consecutive errors are detected. If the predetermined number of errors is detected, a predictive failure analysis alert is generated that informs the user of the presence of a potential memory failure. By employing increasing frequency polling, the invention determines a failing memory address range with a high degree of certainty while simultaneously preventing the polling process from wasting valuable CPU time in a properly functioning system. The polling of the error indicator is accomplished, in one embodiment, by interrupting the processor from the system management device using a general purpose I/O (GPIO) signal. This embodiment beneficially provides a flexible mechanism for producing a system management interrupt in a processor, such as the Opteron® processor from Advanced Micro Devices, that does not incorporate an internal mechanism for initiating predictive failure analysis responsive to an ECC error.

BRIEF DESCRIPTION OF THE DRAWINGS

Other objects and advantages of the invention will become apparent upon reading the following detailed description and upon reference to the accompanying drawings in which.

Figure 1:
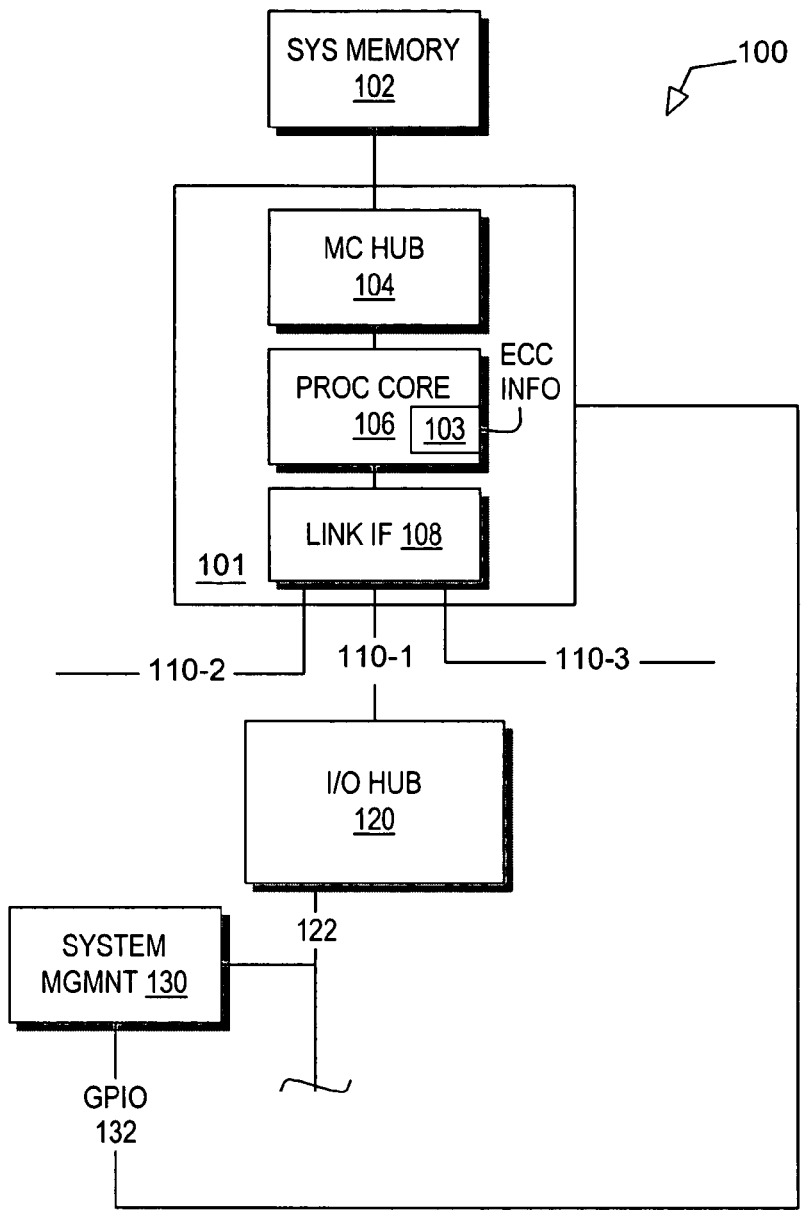
FIG. 1 is a block diagram of selected elements of a data processing system according to the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention concerns predictive failure analysis in a data processing system that includes error correction code (ECC) circuitry in its memory subsystem. Some data processing systems that employ ECC may not include dedicated internal hardware (e.g., registers) that can be used to trigger an interrupt when a memory error occurs. The Opteron® processor from Advanced Micro Devices is an example of such a processor. In systems lacking such facilities, the present invention provides a mechanism for determining with a high degree of certainty that a persistent memory error exists and the location of that persistent error without allocating disproportionate system resources to error detection.

The implemented system and method use a polling technique in conjunction with a watchdog timer and a general purpose I/O signal to provide a periodic check of the processor hardware and, more specifically, a check of a processor resource that indicates the occurrence of an ECC failure associated with the system main memory. Initially, polling of the ECC resource within the processor occurs relatively infrequently so that the polling process does not drain significant CPU time when the system and, more particularly, the main memory subsystem is fully functioning (i.e., the only errors are correctable, non-repetitive, single bit failures that are corrected by the ECC).

If a particular system memory address within a predefined range of addresses causes two consecutive ECC errors, the polling frequency is increased and the number of consecutive errors checked for is increased to N. If the suspect memory address then produces N consecutive errors, the polling frequency and N are increased again. This process repeats until, at some predetermined value of N, the detection of N consecutive errors is interpreted as indicating a persistent failure in the main memory subsystem and an alert is issued to the user or system administrator.

Turning now to the drawings, FIG. 1 is a block diagram of selected elements of a data processing system 100 suitable for use in one embodiment of the present invention. The disclosed polling technique is generally suitable for use with any data processing system that includes ECC circuitry and a system management device. The invention is particularly suitable, however, for use with systems employing processors that lack internal circuitry for counting ECC errors or triggering an interrupt internally in response to an ECC status register condition. System 100 as depicted in FIG. 1 is representative of such a system.

In the depicted embodiment, system 100 includes a processor 101 connected to a system memory 102. The depicted processor 101 includes an integrated memory controller hub 104 that provides an interface between the processor core 106 and system memory 102. In this embodiment, system memory 102 connects directly to external pins of processor 101. Memory controller hub 104 also implements ECC circuitry capable of detecting and correcting single bit failures and of detecting (without correcting) double bit failures.

Processing core 106 includes the processors functional units such as floating point units, arithmetic units, branch units, load/store units, and so forth. Processor 101 likely includes a level one (L1) instruction cache, an L1 data cache, and an on-chip L2 cache memory (not depicted). The depicted embodiment of processor core 101 includes a link interface 108 that couples processor core 106 to an interconnect for I/O and inter-processor communication. In the depicted embodiment, link interface 108 includes three ports for coupling to a set of three distinct links 110-1, 110-2, and 110-3 (generically or collectively referred to as link(s) 110). In one embodiment, each link 110 is implemented as HyperTransport link. HyperTransport is a point-to-point interconnect technology that uses unidirectional, low voltage differential swing signaling on data and command signals to achieve high data rates. Additional descriptions of HyperTransport are available from the HyperTransport consortium (hypertransport.org). In this embodiment, each link 110 is suitable for connecting to another processor or to an I/O device.

In the embodiment depicted in FIG. 1, link 110-1 connects processor 101 to an I/O hub 120. I/O hub 120 provides a bridge between link 110 and a traditional, shared I/O bus 122 such as a Peripheral Component Interface (PCI) bus. A service processor or management device 130 is connected to I/O hub 120 via shared bus 122.

Management device 130 performs or enables various systems administration tasks including, as examples, health monitoring of system environmental parameters, graphical console redirection for remote control of system, remote update of system firmware, and time-stamped logging of notification and alert events. Management device 130 likely has its own source of power such that remote control of system 100 is achievable independent of the system's state.

In the depicted embodiment, processor 101 includes a bit or set of bits that indicate the occurrence of a main memory ECC error. This ECC information is indicated in FIG. 1 by reference numeral 103. In the preferred embodiment, ECC information 103 includes a status bit that indicates if a correctable error in main memory 102 was detected and fixed. ECC information further includes the address of the last correctable error. In some processor implementations, including the Opteron implementation, the ECC information 103 may be read/write enabled wherein any application or operating system code can manipulate the information. In such embodiments, one cannot definitively confirm that an address in the ECC information 103 corresponds to a system memory address that actually produced an ECC failure. The present invention attempts to overcome this limitation on the ECC information by polling the information until an error occurs frequently enough that the information is assumed to be reliable.

The depicted embodiment of system 100 employs a sideband signal 132 to provide a specific communication between system management 130 and processor 101. More specifically, system 100 as depicted provides a general purpose I/O (GPIO) signal 132 from system management 130 to processor 101. In one embodiment, GPIO signal 132 is used to interrupt the processor 101 at intervals by using a program or algorithm executing on system management 130.

While FIG. 1 depicts a hardware implementation containing features or characteristics that are unique to Opteron implementations, it will be appreciated that the present invention is applicable to microprocessors generally and may be implemented in conjunction with substantially any general purpose microprocessor based system. Thus, for example, the invention is not limited to data processing systems employing HyperTransport links and may be equally well suited for systems having more conventional I/O interconnects. Similarly, some microprocessors elect not to integrate memory controller functionality into the processor chip itself and the invention is suitable for use with such systems as well.

Portions of the present invention may be implemented as a sequence of computer executable instructions (computer software). In such embodiments, the instructions are stored on a computer readable medium such as a hard disk drive, magnetic tape, CD ROM, floppy diskette, or other suitable storage medium. When the instructions are being executed by a microprocessor, the instructions may be stored in a volatile storage medium such as system memory 102, a cache memory of processor 101, or DRAM or SRAM associated with system management 130.

Figure 2:
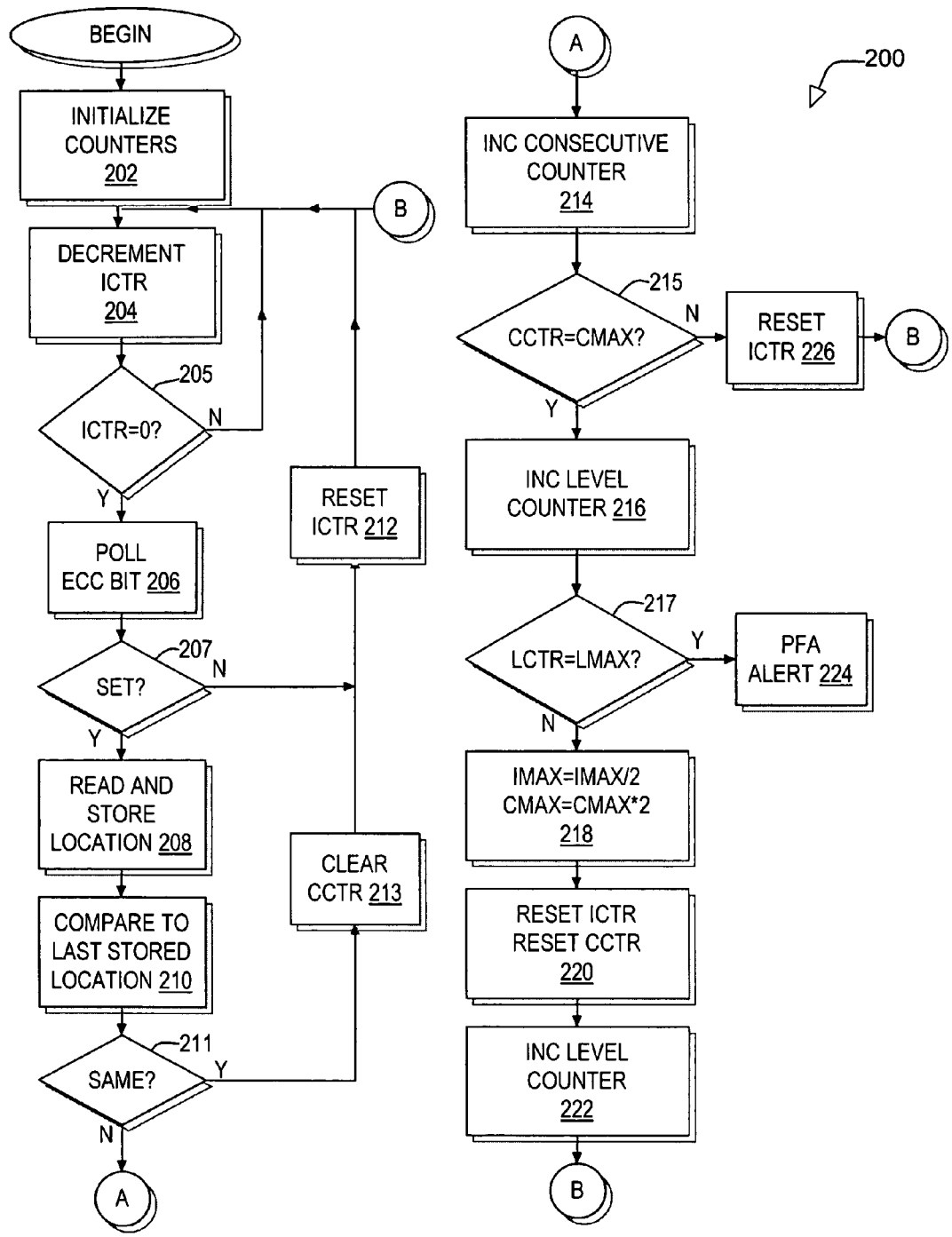
FIG. 2 is a flow diagram of a method of detecting memory errors according to one embodiment of the present invention.

Turning now to FIG. 2, the depicted flow diagram illustrates a method 200 of tracking correctable errors and issuing a predictive failure analysis alert for a data processing system that may lack dedicated hardware facilities for counting correctable errors or for generating an interrupt based on the state of an error code status register. In such systems, the ability to issue a predictive failure analysis alert beneficially enables system administrators to verify and correct sources of repetitive and persistent errors in the system main memory before such errors cause significant permanent failure and/or data loss.

As depicted in FIG. 2, method 200 includes initializing (block 202) a set of counters. Initialization of the counters occurs preferably at each system reset or boot and, in at least some embodiments, on a regular basis such as every 24 hours. In the exemplary embodiment illustrated, a set of three counters is used to implement the method's algorithm. An interval counter (ICTR) is used to monitor intervals between polling events. A level counter (LCTR) and consecutive counter (CCTR) determine the frequency of polling and the number of consecutive errors that must be detected to initiate further action. The three counters are related and some implementations may conserve on the use of variables by deriving one or more of the counter values from the remaining values. The implementation described is believed to provide maximum flexibility by using an independent variable for each of the counters.

Initially, the set of counters are set to values that result in relatively infrequent polling of ECC information 103 with a relatively low threshold for responding to the occurrence of correctable errors by taking additional or heightened action (e.g., polling the system only once every 10 minutes, but taking action if any two consecutive polling events indicate a common system memory address range). As additional correctable errors are encountered, the method gradually transitions to a state where polling occurs relatively frequently but with a higher threshold for taking additional action (e.g., polling every 75 seconds, but taking action only if 16 consecutive errors from the same memory address(es) are encountered). During the initial stages, the relatively infrequent polling is beneficial in reducing administrative load on a processor within a system that is functioning properly. The polling frequency remains at its current level until an error detection condition indicates that heightened scrutiny is desirable. As the system transitions from infrequent polling to frequent polling, the number of consecutive errors that must be observed before additional action is taken increases so as to increase the probability that a detected error is a hard or persistent failure that requires maintenance.

As indicated above, the initial condition of the counters is set so that error information polling occurs every 600 seconds (the polling interval) and wherein heightened action is taken if any two consecutive errors produce a common system memory address. With method 200, which is typically installed and executing on system management 130, the polling interval is derived using a simple counter, referred to herein as the interval counter (ICTR). In one embodiment, for example, the ICTR decrements each cycle of a clock signal that drives system management 130. In this embodiment, the product of the initial ICTR value and the clock signal period determines the polling interval. In other embodiments, the polling interval may be determined differently. System management 130 likely includes a real time clock (RTC) that is needed to provide time-stamping and error logging. In such an embodiment, the polling interval may be determined directly using the real time clock by determining the difference between the current time and the time when an interval was initiated. Regardless of the specific implementation, the polling interval indicates the frequency with which system 100 checks its error information.

After initialization of the counters, method 200 initiates a watchdog timer that will be used to trigger polling of the error information 103. The watchdog timer, as implemented in the depicted embodiment of method 200 is achieved by decrementing (block 204) the ICTR each cycle of a clock signal and comparing (block 205) the ICTR to zero. Until ICTR reaches 0, the timer stays in this loop. When the ICTR reaches 0, the polling interval has expired and system management 130 is directed to poll (block 206) the ECC bit and/or other error information 103 of processor 101.

In one embodiment, it is necessary to halt processor 101 prior to polling error information 103. Because processor 101 may lack internal facilities for interrupting operation responsive to an error information status, the depicted embodiment of method 200 uses system management 130 as an external agent to interrupt the processor at specified intervals so that error information 103 can be queried and appropriate action taken. In such an embodiment, the expiration of a polling interval (ICTR=0) causes system management 130 to assert a GPIO signal that is routed to an interrupt pin of processor 101 or, in some implementations, to an interrupt pin of I/O hub 120. The assertion of the GPIO signal 132 interrupts processor 101 and causes the processor to halt further processing. Power is maintained so that the processor state (information within processor 101) is preserved enabling a subsequent resumption of operations after the error information has been gathered. After processor 101 is halted, system management can retrieve and store error information 103 from processor 101 via I/O hub 120.

If error information 103 indicates that no ECC error has occurred, the ICTR is reset (block 212) and polling continues. If, on the other hand, error information 103 includes an ECC bit that is set (block 207) thereby indicating that a correctable error occurred during an access to system memory 102, the system memory address associated with the error is retrieved from processor 101 and stored in memory of system management 130 for future reference. In some processors, the system memory address associated with an ECC error is stored in a register that is software accessible and capable of being written. In such embodiments, system management 130 cannot be absolutely certain that the system memory address information in error information 103 is accurate since it could have been overwritten by another piece of code. Moreover, even if the system memory address is accurate, it may be desirable to simply ignore the occurrence of a single correctable error. Both of these considerations are taken into account by deferring corrective action or alert broadcasting until the suspected source of the error can be verified and duplicated.

Accordingly, the depicted embodiment of method 200 compares the system memory address retrieved from error information 103 and compares (block 210) the retrieved address to the immediately preceding stored address. If the current system memory address does not match (block 211) the prior address, the consecutive counter (CCTR) is cleared (block 213), the ICTR is reset to its initial value and polling continues at the current level of frequency. If, however, the system memory address retrieved from error information 103 matches the previously retrieved address, the CCTR is incremented. As implied by its name, the CCTR tracks the number of times in succession that error information 103 indicates a particular system memory address. The current value of CCTR is then compared to a maximum value (CMAX) to determine if the number of consecutive errors exceeds the current threshold for taking additional action such as increasing the polling frequency or issuing a system alert. CMAX thus represents the number of consecutive errors required to take further action. The value of CMAX is increased gradually in the depicted embodiment of method 200 as the polling frequency is increased so that, at higher polling frequencies, a greater number of consecutive errors is required to trigger still greater scrutiny (i.e., higher polling frequency).

After incrementing CCTR in block 214, CCTR is compared to the current value of CMAX (block 215). If CCTR is not equal to CMAX, the number of consecutive errors thus far is not sufficient to warrant a higher polling frequency or other action. Instead, the interval counter is simply reset and polling resumes from block 204 as described above. If CCTR is equal to CMAX (block 215), the number of consecutive errors warrants additional action. In the depicted embodiment, the additional action that may be taken includes issuing a predictive failure analysis alert or increasing the polling frequency. The predictive failure analysis alert is issued if the polling frequency and number of consecutive errors have reached a predetermined threshold.

In the depicted embodiment, the level counter (LCTR) is used to determine if the predetermined threshold has been exceeded. The LCTR is incremented (block 216) and checked (block 217) against a predetermined maximum number of levels (LMAX) to determine if the level of scrutiny is now sufficient to justify the issuance of a predictive failure analysis alert (block 224). If LCTR is not equal to LMAX, then method 200 will "go to the next level" by increasing the polling frequency and increasing the number of consecutive errors required. In the depicted embodiment, the polling frequency is increased by halving IMAX while the number of consecutive errors required is increased by doubling CMAX (block 218). IMAX is the value to which ICTR is reset and defines the polling interval. After adjusting the polling frequency and number of consecutive errors required in block 220, ICTR and CCTR are reset (block 220), LCTR is incremented (block 222), and the watchdog timer resumes (at the new polling frequency) at block 204.

Although the depicted embodiment uses a level counter and a consecutive counter to determine when to issue the alert, it will be appreciated that other embodiments may eliminate the level counter and simply compare the consecutive counter to a second threshold value to determine when to issue an alert. In such an embodiment, blocks 216 and 217 can be replaced by a block in which CCTR is compared against a second maximum value (CMAX2). If CCTR exceeds this threshold, then the alert is issued in block 224.

In one embodiment, the initial polling interval is roughly 600 seconds (10 minutes), and the number of levels is four. In this implementation, the system will poll the processor every 10 minutes until two consecutive errors (from a single address) are detected. Polling then proceeds every 300 seconds until four consecutive errors are detected, at which point polling occurs every 150 seconds until eight consecutive errors are found. Finally, polling happens every 75 seconds until sixteen consecutive errors are found and an alert is issued. Method 200 as described applies to a single processor system. In a multiprocessor system, the method may be extended by checking the error code of each processor in the system at each polling interval and maintain the system memory address information for each processor.

It will be apparent to those skilled in the art having the benefit of this disclosure that the present invention contemplates a mechanism for detecting and responding to correctable errors in a processor lacking internal resources for this purpose. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A computer program product for monitoring errors in a system memory of a data processing system, the program product comprising computer executable code stored on a computer readable medium, comprising:

code means for periodically polling a processor of the data processing system to determine if a system memory error has occurred;

code means for retrieving and storing the system memory address associated with the system memory error;

code means for determining a number of consecutive system memory errors associated with the retrieved address and comparing the number of consecutive errors to a predetermined threshold; and code means for increasing the frequency of polling and increasing the predetermined threshold responsive to the number of consecutive errors equaling the existing predetermined threshold.

2. The computer program product of claim 1, wherein the code means for increasing the frequency of polling and increasing the threshold includes code means for doubling the polling frequency and the threshold each time the number of consecutive errors equals the existing value of the threshold.

3. The computer program product of claim 1, further comprising code means for comparing the number of consecutive errors to a second threshold and, responsive to the number of consecutive errors equaling the second threshold, issuing a system alert.

4. The computer program product of claim 1, further comprising code means for initializing the polling frequency and the consecutive error threshold to initial values prior to initiating the polling and thereafter resetting polling frequency and the consecutive error threshold periodically, wherein the polling frequency greatly exceeds the resetting frequency.

5. The computer program product of claim 4, wherein said code means for periodically polling comprises code means for implementing a watchdog timer and initiating a polling event at determined intervals of the timer.

6. The computer program product of claim 5, wherein the code means for implementing the watchdog timer comprises code means for initializing a counter and decrementing the counter on every transition of a periodic clock signal.

7. The computer program product of claim 5, wherein the code means for implementing the watchdog timer comprises code means for retrieving real time values from a real time clock and determining a polling interval based on the real time clock values.

8. A data processing system, comprising:

a system memory;

a memory controller coupled to the system memory and a processor coupled to the memory controller, wherein the controller implements error correction circuitry enabled to identify and correct at least some system memory errors;

a dedicated interconnect to provide an interrupt signal to the processor wherein assertion of the interrupt signal interrupts the processor;

a management device coupled to the processor, the management device being enabled to;

periodically assert the dedicated interconnect to interrupt the processor and poll system memory error information, including system memory address information, of the processor following each interrupt;

track the number of errors associated with any particular system memory address;

increase the frequency of said polling if the number of errors associated with a particular memory address equals a firs threshold; and issue a system alert if the number of errors associated with a particular memory address equals a second threshold;

wherein the management device is configured to double the polling frequency and the first threshold value each time the number of errors associated with a particular memory address equals the existing firs threshold value.

9. The system of claim 8, wherein the dedicated interconnect is connected to a general purpose I/O pin of the management device.

10. The system of claim 8, wherein an initial first threshold value is 2 and the second threshold value is 16.

11. The system of claim 10, wherein the period of the initial polling frequency is approximately 600 seconds.

12. The system of claim 8, wherein the management device is further configured to reset the polling frequency and first threshold value to their respective initial values periodically.

13. The system of claim 12, wherein the period associated with resetting the first threshold value is 24 hours.

14. A system management device suitable for use in a data processing system comprising a processor coupled to a system memory, wherein the system management device is configured to
   implement a watchdog timer and to assert a signal periodically to interrupt the processor;
   retrieve system memory error information including any corresponding system memory address information from the processor following assertion of the signal; and
   track the number of system memory errors corresponding to any particular system memory address;
   issue an alert if the number of system memory errors corresponding to a particular system memory address equals a specified maximum value; and
   increase the first threshold value each time the number of errors associated with any particular memory address equals the first threshold.

15. The management device of claim 14, further configured to assert the signal by asserting a general purpose I/O pin.

16. The management device of claim 14, further configured to track the number of consecutive system memory errors corresponding to any particular system memory address.

17. The management device of claim 14, further configured to increase the frequency of interrupting the processor if the number of errors associated with any particular memory address equals a first threshold.

18. The management device of claim 14, further configured to double the frequency of interrupting the processor and the first threshold value each time the number of errors associated with any particular memory address equals the first threshold value.

* * * * *